UNITED STATES PATENT OFFICE.

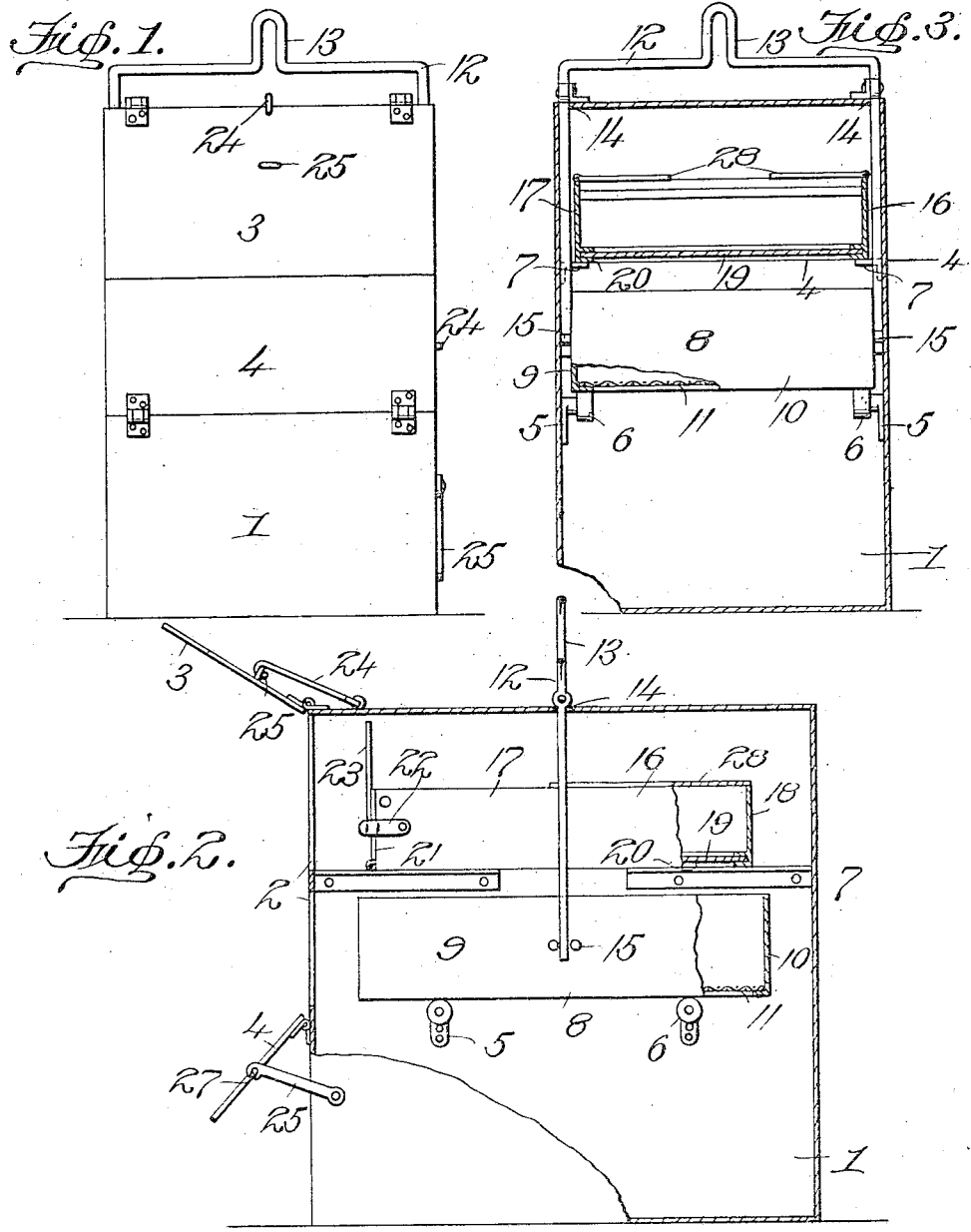

ROBERT LE MOND, OF PLAINFIELD, NEW JERSEY.

ASH-SIFTER.

1,288,062.

Specification of Letters Patent.

Patented Dec. 17, 1918.

Application filed December 18, 1916. Serial No. 137,630.

*To all whom it may concern:*

Be it known that I, ROBERT LE MOND, a citizen of the United States, residing at Plainfield, in the county of Union, State of New Jersey, have invented certain new and useful Improvements in Ash-Sifters; and I do hereby declare the following to be a full, clear, and exact description of the invention, such as will enable others skilled in the art to which it appertains to make and use the same.

The present invention is directed to improvements in ash sifters, and has for its object to provide a device of this character so constructed that all dust arising during the sifting operation will be prevented from escaping.

A further object of the invention is to provide an ash sifter constructed in such a manner that the ash pan of the stove can be easily placed within the sifter, and the ashes therefrom conveniently transferred to the sifter.

A still further object of the invention is to provide novel means for actuating the sifter.

With these and other objects in view, this invention resides in the novel features of construction, formation, combination and arrangement of parts to be hereinafter more fully described, claimed and illustrated in the accompanying drawing, in which:—

Figure 1 is a front view of the device.

Fig. 2 is a longitudinal sectional view through the device.

Fig. 3 is a transverse sectional view.

Fig. 4 is a sectional view on line 4—4 of Fig. 3.

Referring to the drawing 1 indicates a casing, which is rectangular in shape and has its front wall provided with an opening 2, normally closed by upper and lower doors 3 and 4.

Fixed to the inner surfaces of the sides of the casing 1 are horizontally disposed brackets 5, provided with rollers 6, the purpose of which will appear later. Similarly mounted above the brackets 5 are brackets 7.

The sifter 8 is formed from sheet metal and consists of sides 9 and ends 10, having a wire mesh bottom 11. The sifter engages the roller 6 so that the same can be easily reciprocated. A yoke 12 is provided and has its bight portion provided with a handle 13, while the arms thereof are engaged in openings 14 formed in the top of the casing and are pivotally connected to said top. The sides of the sifter 8 are provided with spaced lugs 15 which receive therebetween the lower ends of the arms of the yoke. Thus it will be seen that the handle 13 can be grasped and the yoke rocked, thereby reciprocating the sifter 8.

The ash pan 16 consists of sides 17 and an end 18, the bottom 19 of said pan being slidably engaged in the guide 20 formed in the lower ends of the sides 17. To the forward end of the bottom 20 is hingedly connected the forward end 21 of the pan, which is held in its closed position by latches 22 pivotally connected to the sides 17. The end 21 is provided with a handle 23 which serves to remove the bottom 19 when the latches 22 are disengaged from said ends.

It will be of course understood that the pan 16 is engaged in the casing 1 after the same has been removed from the ash pit of the stove. After the pan 16 has been placed upon the brackets 7, the bottom 19 is removed so that the ashes will fall into the sifter 8. The doors 3 and 5 are then closed and the sifter subjected to reciprocatory movement, whereby the dust will fall into the casing.

A pivoted hook 24 is carried by the top of the casing and engages the keeper 25 carried by the door 3. A latch 26 is carried by one side of the casing 1 for engaging the keeper 27 carried by the door 4. The hook 24 and latch 26 are engaged with the respective doors so as to hold the same against swinging movement when it is desired to dump the ashes from the casing, and at which time the sifter and pan have been removed.

The pan 16 may, if desired, be provided with the closures 28 pivoted to the sides thereof and extending for a portion of the length of the pan, said closures being adapted to partially close said pan.

What is claimed is:

A device of the character described comprising a casing having upper and lower door openings in one end thereof, doors for said openings, bearings mounted upon the sides of said casing in horizontal alinement with the bottom of said lower opening, a sifter insertible through said lower door opening and adapted for reciprocatory movement on said bearings, spaced lugs carried by each side of the sifter, supporting brackets secured to each side of said casing above said bearings and having adjacent ends in spaced horizontal alinement, said brackets being also in alinement with the bottom of said upper door opening for supporting an ash can above said sifter, and a yoke pivoted to the top of said casing and having its bight portion extending transversly of the top and its sides projecting into the casing between the sides of said sifter and the adjacent walls of the casing and movable between the adjacent ends of said spaced supporting brackets and engaging between said lugs whereby to reciprocate said sifter.

In testimony whereof, I affix my signature, in the presence of two witnesses.

ROBERT LE MOND.

Witnesses:
 WILLIAM G. DE MEZA,
 AUGUST HEDRICH.

Copies of this patent may be obtained for five cents each, by addressing the "Commissioner of Patents, Washington, D. C."